UNITED STATES PATENT OFFICE.

CLEMENT B. TOWER, OF HYDE PARK, MASSACHUSETTS.

ACID GELATINE.

SPECIFICATION forming part of Letters Patent No. 398,916, dated March 5, 1889.

Application filed July 14, 1888. Serial No. 279,985. (No specimens.)

*To all whom it may concern:*

Be it known that I, CLEMENT B. TOWER, a citizen of the United States, residing at Hyde Park, in the county of Norfolk and State of Massachusetts, have invented certain new and useful Improvements in Gelatine; and I do declare the following to be a full, clear, and exact description of the invention, such as will enable others skilled in the art to which it appertains to make and use the same.

My invention has relation to the preparation of medicinal or edible gelatine for table use; and the object of my invention is to produce a gelatine in a commercially dry and brittle form that shall in itself possess valuable nutritive and medicinal qualities and be an active therapeutic agent; and to these ends the invention consists in incorporating with the gelatine a free phosphoric acid or a combination of phosphoric acid with a base, preferably lime, in such proportions that jellies and the like may be prepared for table use without the addition of lemon or other acid juice.

It has been proposed to add lime-juice to gelatine; but the result is an unsightly, dark, and plastic compound, which has no commercial value, and as such it differs from the herein-described compound, in which a pure acid is added to gelatine, whereby a compound is produced which when dried becomes frangible or brittle and is clear and transparent in appearance.

To carry my invention into effect, I take ordinary dry gelatine and make a solution with water in the usual manner, and for every one hundred (100) pounds of dry gelatine I add about nine (9) pounds of calcic phosphate mixed with nine (9) or ten (10) quarts of a fifty-degree (50°) Baumé solution of phosphoric acid. This mixture is then thoroughly agitated to insure a proper incorporation of the ingredients. After being clarified, if necessary, the solution is then strained and run into pans and allowed to jellify. It is then cut into sheets, placed upon frames, and dried in the usual manner. After it is thoroughly dry it may be packed for the market as it is, in sheets; or, if preferred, it may be broken into flakes, granulated, ground, or shredded to facilitate its dissolving. Acidulated gelatine thus prepared is dry and frangible or brittle and readily soluble for its various edible uses.

Of course it will readily be understood that instead of mixing the acid with commercial gelatine I can take bones, animal tissue, calves' feet, or other gelatine-producing material, and obtain a solution of the gelatine by any of the methods now employed and well known to those skilled in the art. I can then determine by any convenient method the amount of commercially-dry gelatine the solution contains and proceed to mix the calcic phosphate and phosphoric-acid solution, as described above. When it is desired to produce an acidulated gelatine, only phosphoric acid may be employed alone, using about the quantity above given; or citric, lactic, tartaric, or other innocuous acid, or a mixture of these acids, may be used, the degree of acidity required of course determining the proportion of acid to be added. I have found a mixture of phosphoric and citric acids to produce good results, using to every hundred (100) pounds of dry gelatine twenty (20) pounds of fifty-degree (50°) Baumé phosphoric and five (5) pounds of citric acid in crystals. The incorporation of phosphoric acid and its compounds enables me to produce an acidulated gelatine possessing decided nutritive qualities, and which as a therapeutic agent is a valuable tonic and digestive stimulant, furnishing the system with the much-needed phosphate when prepared with sugar and wine; and left to jellify it furnishes a valuable health food for the sick and convalescent. It is obvious that considerable latitude in preparing my acidulated gelatine, both in the selection of the ingredients to give it the acid character and in the proportions used, may be employed without departing from the spirit of my invention. Therefore I do not wish to limit myself to any particular formula or process.

In a concurrent application, Serial No. 277,097, I have described and claimed an acidulated gelatine consisting of gelatine and an edible vegetable acid.

What I claim, and desire to secure by Letters Patent, is—

1. Acidulated gelatine in a dry and frangible or brittle form, consisting of ordinary gelatine combined with an innocuous acid, as set forth.

2. Acidulated gelatine in a dry and brittle form, consisting of ordinary gelatine combined with free phosphoric acid, as set forth.

3. Acidulated gelatine in a dry and brittle form, consisting of ordinary gelatine containing a mixture of phosphoric and other innocuous acids, as set forth.

4. Acidulated gelatine in a dry and brittle form, consisting of ordinary gelatine combined with phosphoric and citric acids, as set forth.

In testimony whereof I affix my signature in presence of two witnesses.

CLEMENT B. TOWER.

Witnesses:
ALONZO DAVIS,
CHARLES G. SLOAN.